US011149563B2

(12) United States Patent
Vetters et al.

(10) Patent No.: US 11,149,563 B2
(45) Date of Patent: Oct. 19, 2021

(54) CERAMIC MATRIX COMPOSITE BLADE TRACK WITH MOUNTING SYSTEM HAVING AXIAL REACTION LOAD DISTRIBUTION FEATURES

(71) Applicants: Rolls-Royce Corporation, Indianapolis, IN (US); Rolls-Royce High Temperature Composites Inc., Cypress, CA (US)

(72) Inventors: Daniel K. Vetters, Indianapolis, IN (US); Jeffrey M. Crutchfield, Long Beach, CA (US)

(73) Assignees: Rolls-Royce Corporation, Indianapolis, IN (US); Rolls-Royce High Temperature Composites Inc., Cypress, CA (US)

( * ) Notice: Subject to any disclaimer, the term of this patent is extended or adjusted under 35 U.S.C. 154(b) by 76 days.

(21) Appl. No.: 16/593,535

(22) Filed: Oct. 4, 2019

(65) Prior Publication Data
US 2021/0102470 A1  Apr. 8, 2021

(51) Int. Cl.
*F01D 25/24* (2006.01)
*F01D 5/30* (2006.01)

(52) U.S. Cl.
CPC .............. *F01D 5/30* (2013.01); *F01D 25/24* (2013.01); *F05D 2220/32* (2013.01); *F05D 2300/6033* (2013.01)

(58) Field of Classification Search
CPC ........ F01D 5/30; F01D 25/24; F05D 2220/32; F05D 2300/6033
See application file for complete search history.

(56) References Cited

U.S. PATENT DOCUMENTS

| 2,834,537 | A |   | 5/1958  | Neary |
|-----------|---|---|---------|-------|
| 2,925,290 | A |   | 2/1960  | Greenwald |
| 4,576,548 | A | * | 3/1986  | Smed .................... F01D 11/005 |
|           |   |   |         |     415/137 |
| 4,759,687 | A |   | 7/1988  | Miraucourt et al. |
| 4,841,726 | A |   | 6/1989  | Burkhardt |
| 4,875,828 | A |   | 10/1989 | Willkop et al. |
| 4,934,900 | A |   | 6/1990  | Schonbach et al. |
| 5,141,395 | A |   | 8/1992  | Carroll et al. |
| 5,169,287 | A |   | 12/1992 | Proctor et al. |
| 5,180,281 | A |   | 1/1993  | Burge et al. |
| 5,272,869 | A |   | 12/1993 | Dawson et al. |
| 5,288,206 | A |   | 2/1994  | Bromann et al. |
| 5,320,486 | A |   | 6/1994  | Walker et al. |
| 5,522,705 | A |   | 6/1996  | Elaini et al. |

(Continued)

FOREIGN PATENT DOCUMENTS

EP      171329 A1    2/1986
EP    1965030 A2    9/2008

(Continued)

*Primary Examiner* — Justin D Seabe
*Assistant Examiner* — Theodore C Ribadeneyra
(74) *Attorney, Agent, or Firm* — Barnes & Thornburg LLP

(57) ABSTRACT

An assembly adapted for use in a gas turbine engine has a carrier component and a supported component. The assembly includes a mounting system for coupling the supported component to the carrier component. In an illustrative embodiment, the assembly is a turbine shroud segment for blocking gases from passing over turbine blades included in the gas turbine engine.

20 Claims, 4 Drawing Sheets

(56) References Cited

U.S. PATENT DOCUMENTS

| | | | | |
|---|---|---|---|---|
| 5,603,510 | A * | 2/1997 | Sanders | F01D 11/025 |
| | | | | 277/413 |
| 5,957,067 | A | 9/1999 | Dobbeling et al. | |
| 5,971,703 | A | 10/1999 | Bouchard | |
| 6,048,170 | A * | 4/2000 | Dodd | F01D 11/005 |
| | | | | 415/135 |
| 6,062,813 | A | 5/2000 | Halliwell et al. | |
| 6,315,519 | B1 * | 11/2001 | Bagepalli | F04D 29/023 |
| | | | | 415/135 |
| 6,382,905 | B1 | 5/2002 | Czachor et al. | |
| 6,543,995 | B1 | 4/2003 | Honda et al. | |
| 6,572,115 | B1 * | 6/2003 | Sarshar | F16J 15/3288 |
| | | | | 277/412 |
| 6,575,697 | B1 | 6/2003 | Arilla et al. | |
| 6,602,050 | B1 | 8/2003 | Scheurlen et al. | |
| 6,655,696 | B1 | 12/2003 | Fang et al. | |
| 6,726,448 | B2 * | 4/2004 | McGrath | F01D 25/246 |
| | | | | 415/173.3 |
| 6,733,233 | B2 * | 5/2004 | Jasklowski | F01D 11/025 |
| | | | | 415/135 |
| 6,733,235 | B2 | 5/2004 | Alford et al. | |
| 6,884,026 | B2 | 4/2005 | Glynn et al. | |
| 6,904,757 | B2 | 6/2005 | Mitchell et al. | |
| 6,932,566 | B2 | 8/2005 | Suzumura et al. | |
| 6,942,203 | B2 | 9/2005 | Schroder et al. | |
| 6,969,236 | B2 | 11/2005 | Giesler et al. | |
| 7,001,493 | B1 | 2/2006 | Kim | |
| 7,052,235 | B2 | 5/2006 | Alford et al. | |
| 7,056,053 | B2 | 6/2006 | Schilling et al. | |
| 7,066,470 | B2 | 6/2006 | Turnquist et al. | |
| 7,094,029 | B2 | 8/2006 | Taylor et al. | |
| 7,114,920 | B2 | 10/2006 | Synnott | |
| 7,189,057 | B2 * | 3/2007 | Lee | F01D 11/16 |
| | | | | 415/128 |
| 7,207,771 | B2 * | 4/2007 | Synnott | F01D 11/08 |
| | | | | 415/173.1 |
| 7,229,246 | B2 | 6/2007 | Ghasripoor et al. | |
| 7,237,389 | B2 | 7/2007 | Ryan et al. | |
| 7,238,002 | B2 * | 7/2007 | Cairo | F01D 11/005 |
| | | | | 415/119 |
| 7,435,049 | B2 * | 10/2008 | Ghasripoor | F01D 11/14 |
| | | | | 415/173.3 |
| 7,494,317 | B2 | 2/2009 | Keller et al. | |
| 7,546,743 | B2 | 6/2009 | Bulman et al. | |
| 7,614,848 | B2 | 11/2009 | Bogue et al. | |
| 7,726,936 | B2 | 6/2010 | Keller et al. | |
| 8,047,773 | B2 * | 11/2011 | Bruce | F01D 25/04 |
| | | | | 415/173.3 |
| 8,047,779 | B2 | 11/2011 | Roy et al. | |
| 8,122,727 | B2 | 2/2012 | Shi et al. | |
| 8,133,013 | B2 | 3/2012 | Audeon et al. | |
| 8,257,029 | B2 * | 9/2012 | Habarou | F01D 11/125 |
| | | | | 415/135 |
| 8,303,246 | B2 | 11/2012 | Drelon et al. | |
| 8,430,629 | B2 | 4/2013 | Turi et al. | |
| 8,454,023 | B2 | 6/2013 | Samudrala et al. | |
| 8,834,105 | B2 | 9/2014 | Albers et al. | |
| 8,973,375 | B2 | 3/2015 | O'Leary | |
| 9,039,358 | B2 | 5/2015 | Tholen et al. | |
| 9,080,463 | B2 | 7/2015 | Denece et al. | |
| 9,127,569 | B2 | 9/2015 | Akiyama et al. | |
| 9,249,684 | B2 | 2/2016 | Lazur et al. | |
| 9,593,596 | B2 | 3/2017 | Uskert et al. | |
| 9,726,043 | B2 | 8/2017 | Franks et al. | |
| 9,759,082 | B2 | 9/2017 | Thomas et al. | |
| 9,845,692 | B2 | 12/2017 | Jamison | |
| 9,915,153 | B2 | 3/2018 | Sener | |
| 9,938,846 | B2 | 4/2018 | Freeman et al. | |
| 10,041,369 | B2 | 8/2018 | Blaney et al. | |
| 10,054,232 | B2 | 8/2018 | Seaton | |
| 10,100,649 | B2 | 10/2018 | Thomas | |
| 10,138,746 | B2 | 11/2018 | McMahon | |
| 10,184,356 | B2 | 1/2019 | McCaffrey | |
| 10,208,614 | B2 | 2/2019 | Hafner et al. | |
| 10,215,056 | B2 | 2/2019 | Sippel et al. | |
| 2002/0192074 | A1 * | 12/2002 | Turnquist | F16J 15/3288 |
| | | | | 415/173.3 |
| 2003/0102630 | A1 * | 6/2003 | Dine | F01D 11/025 |
| | | | | 277/355 |
| 2004/0188947 | A1 | 9/2004 | Paprotna | |
| 2006/0067815 | A1 | 3/2006 | Ghasripoor et al. | |
| 2008/0178465 | A1 | 7/2008 | Schiavo et al. | |
| 2009/0110546 | A1 | 4/2009 | Tholen et al. | |
| 2009/0123278 | A1 | 5/2009 | Audeon et al. | |
| 2012/0027572 | A1 | 2/2012 | Denece et al. | |
| 2012/0243977 | A1 * | 9/2012 | Simonet | F01D 25/246 |
| | | | | 415/173.3 |
| 2012/0248704 | A1 | 10/2012 | Fennell et al. | |
| 2013/0202430 | A1 * | 8/2013 | Gaudry | F01D 25/243 |
| | | | | 415/214.1 |
| 2014/0127457 | A1 | 5/2014 | Hillier | |
| 2014/0147266 | A1 | 5/2014 | Kramer | |
| 2015/0377050 | A1 | 12/2015 | Freeman et al. | |
| 2016/0102572 | A1 | 4/2016 | O'Leary | |
| 2016/0169038 | A1 | 6/2016 | Weaver et al. | |
| 2016/0186999 | A1 | 6/2016 | Freeman et al. | |
| 2016/0201910 | A1 | 7/2016 | Chang et al. | |
| 2016/0290140 | A1 | 10/2016 | Thomas et al. | |
| 2016/0290145 | A1 | 10/2016 | Roussille et al. | |
| 2016/0333715 | A1 | 11/2016 | McCaffrey | |
| 2016/0376901 | A1 * | 12/2016 | O'Leary | F01D 9/02 |
| | | | | 415/116 |
| 2017/0101882 | A1 | 4/2017 | Sippel et al. | |
| 2017/0130600 | A1 | 5/2017 | Shapiro et al. | |
| 2017/0260869 | A1 | 9/2017 | Vetters et al. | |
| 2017/0260877 | A1 | 9/2017 | King et al. | |
| 2018/0051581 | A1 | 2/2018 | Quennehen et al. | |
| 2018/0106160 | A1 | 4/2018 | Thomas et al. | |
| 2018/0149030 | A1 | 5/2018 | Freeman et al. | |
| 2018/0149041 | A1 | 5/2018 | Freeman et al. | |
| 2018/0149042 | A1 | 5/2018 | Freeman et al. | |
| 2018/0156068 | A1 | 6/2018 | Roussille et al. | |
| 2018/0328208 | A1 | 11/2018 | O'Leary et al. | |
| 2019/0107001 | A1 | 4/2019 | Crutchfield | |
| 2019/0107002 | A1 | 4/2019 | Crutchfield | |
| 2020/0378264 | A1 * | 12/2020 | Vetters | F01D 11/08 |

FOREIGN PATENT DOCUMENTS

| | | |
|---|---|---|
| EP | 3037628 A1 | 6/2016 |
| EP | 3075965 A1 | 10/2016 |
| EP | 3309366 A1 | 4/2018 |
| EP | 3330497 A1 | 6/2018 |
| WO | 1999031414 A1 | 6/1999 |
| WO | 2014186099 A1 | 11/2014 |
| WO | 2018172655 A1 | 9/2018 |

* cited by examiner

CERAMIC MATRIX COMPOSITE BLADE TRACK WITH MOUNTING SYSTEM HAVING AXIAL REACTION LOAD DISTRIBUTION FEATURES

FIELD OF THE DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional fasteners such as rivets or bolts may present problems due to thermal expansion and/or material properties of the ceramic matrix composite components.

SUMMARY

The present disclosure may comprise one or more of the following features and combinations thereof.

According to an aspect of the present disclosure, a turbine shroud segment adapted for use in a gas turbine engine includes a carrier segment, a blade track segment, and a mounting system. The carrier segment may include metallic materials. The carrier segment may include an outer wall and a first reinforcement flange. The outer wall extends axially and circumferentially relative to an axis. The first reinforcement flange extends radially inward from the outer wall of the carrier segment. The blade track segment may include ceramic matrix composite materials. The blade track segment may include a runner shaped to extend circumferentially partway around the axis and an attachment portion that extends radially outward from the runner relative to the axis.

The mounting system can be configured to couple the blade track segment with the carrier segment. The mounting system may include a first brace formed to include a bracket that engages the attachment portion of the blade track segment and a threaded shaft that extends from the bracket. The threaded shaft extends radially outward through the outer wall of the carrier segment to couple the blade track segment with the carrier segment at an attachment joint. The bracket of the first brace may be configured to engage the first reinforcement flange of the carrier segment. This engagement can limit bending of the first brace about the attachment joint due to radial force loads being applied to the blade track segment. The radial loads are transferred to the bracket of the first brace so that the first brace maintains a radial position of the blade track segment relative to the axis.

In some embodiments, the bracket of the first brace may include a support body, a track location arm, and a load-reaction pad. The threaded shaft extends radially outward from the support body. The track-location arm extends axially outward from the support body and engages an inner surface of the attachment portion of the blade track segment. The load-reaction pad extends axially from the support body and may be configured to engage the first reinforcement flange. In some embodiments, the load-reaction pad is engaged directly with the first reinforcement flange.

In some embodiments, the load-reaction pad may be spaced apart from the first reinforcement flange. The load reaction pad in this position may be configured to deform plastically to engage the first reinforcement flange during use of the turbine shroud segment.

In some embodiments, the first reinforcement flange may include a radially extending lip and a leg that extends axially from the lip. The leg may be configured to engage the load-reaction pad included in the bracket. In some embodiments, the lip and the leg may cooperate to define a seal channel that extends radially into the first reinforcement flange and extends circumferentially relative to the axis. In some embodiments, an axially aft facing surface of the load-reaction pad may be configured to engage an axially fore facing surface of the leg.

In some embodiments, the bracket of the first brace may be spaced apart from the first reinforcement flange and the threaded shaft of the first brace may be configured to bend and deform plastically. This may cause the bracket of the first brace to engage the first reinforcement flange of the carrier segment during use of the turbine shroud segment.

In some embodiments, the carrier segment may include a second reinforcement flange spaced apart axially from the first reinforcement flange to locate the mounting system there between. The mounting system may include a second brace. The second brace may include a bracket and a threaded shaft. The bracket may engage the attachment portion of the blade track segment. The threaded shaft may extend from the bracket radially outward and through the outer wall of the carrier segment to couple the blade track segment with the carrier segment. The first brace may be spaced apart axially from the second brace to locate the blade track segment there between. The second brace may engage with the second reinforcement flange of the carrier segment without bending of the threaded shaft of the second brace. In some embodiments, the attachment portion of the blade track segment may have a T-shape when viewed in the circumferential direction with a stem that extends radially outward from the runner.

In some embodiments, the carrier segment may include a locator pad that extends from one of the outer wall and the first reinforcement flange. The locator pad may engage the attachment portion of the blade track segment to axially locate the blade track segment relative to the carrier segment. In some embodiments, the locator pad may extend axially from the first reinforcement flange and engages an axially aft facing surface of the attachment portion of the blade track segment.

According to another aspect of the present disclosure, a turbine shroud adapted for use in a gas turbine engine includes a carrier component, a blade track segment, and a mounting system. The carrier component may include an outer wall that extends circumferentially at least partway around an axis and a reinforcement flange that extends radially inward from the outer wall. The blade track segment may include a runner shaped to extend circumferentially partway around the axis and an attachment portion that extends radially outward from the runner.

The mounting system may include a plurality of braces and a plurality of threaded nuts that engage with the plurality of braces. Each brace included in the plurality of braces may include a threaded shaft, a track-location arm, and a load-reaction pad. The threaded shaft extends through the outer wall of the carrier component. The track-location arm extends axially forward or aft of the threaded shaft and engages the attachment portion of the blade track segment. The load-reaction pad may extend axially forward or aft of the threaded shaft, opposite of the track-location arm, and engages the reinforcement flange of the carrier component.

In some embodiments, the track-location arm may include a cantilevered boom and a plurality of engagement pads. The cantilevered boom may extend from a support body included in the brace. The plurality of engagement pads may extend radially outward from the cantilevered boom of the track-location arm into direct contact with the blade track segment. In some embodiments, the plurality of engagement pads included in the track-location arm includes two circumferentially spaced apart pads.

In some embodiments, the attachment portion of the blade track segment has a T-shape when viewed in the circumferential direction. The blade track segment has a stem that extends radially outward from the runner and an attachment panel that extends radially forward and aft from the stem. The attachment panel may be arranged such that the entire blade track segment has a generally I-beam shape when viewed in the circumferential direction.

In some embodiments, at lease one of the plurality of braces may be located along an axially forward side of the attachment portion of the blade track segment. At least one of the plurality of braces may be located along an axially aft side of the attachment portion of the blade track segment.

In some embodiments, the reinforcement flange may include a lip and a leg. The lip may extend radially inward from the outer wall. The leg may extend axially from the lip and is configured to engage the plurality of braces.

According to an aspect of the present disclosure, a method may include a number of steps. The method may include providing a carrier segment, a blade track segment that includes a runner and an attachment portion coupled with the runner, and a brace that includes a bracket and a shaft that extends from the bracket, engaging the attachment portion of the blade track segment with the bracket of the brace, translating the brace and the blade track segment radially relative to the carrier segment so that the shaft extends through the carrier segment, coupling the shaft with the carrier segment at an attachment joint, applying radial force loads with pressurized gas to the runner of the blade track segment to urge the blade track segment radially inward which urges the shaft to bend about the attachment joint, and applying an axial force to the bracket with the carrier segment to limit bending of the shaft about the attachment joint which limits radial inward movement of the blade track segment.

In some embodiments, the carrier segment includes an outer wall and a reinforcement flange. The outer wall extends at least partway about an axis. The reinforcement flange extends radially inward from the outer wall. When an axial force is applied to the bracket, the carrier segment may engage an aft facing surface of the bracket with the reinforcement flange.

These and other features of the present disclosure will become more apparent from the following description of the illustrative embodiments.

DETAILED DESCRIPTION OF THE DRAWINGS

Figure 1:
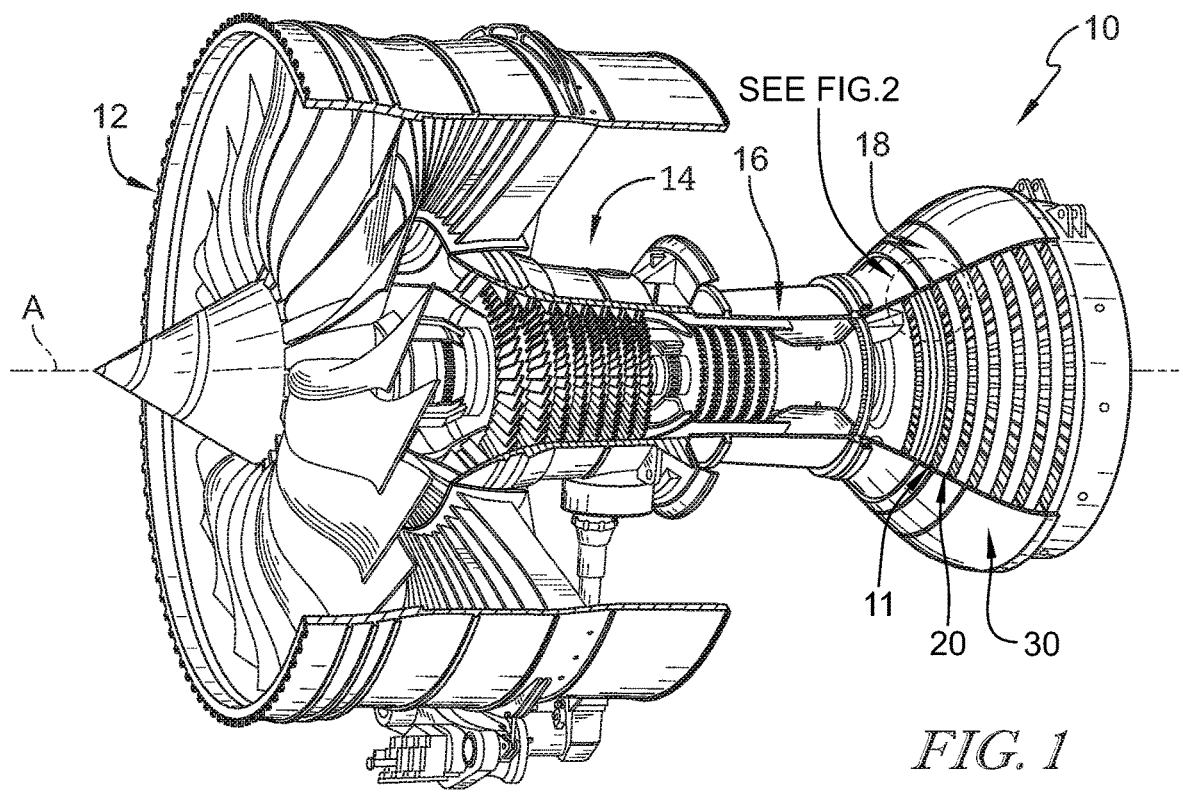
FIG. 1 is a cut-away perspective view of a gas turbine engine showing that the exemplary engine includes a fan driven by an engine core having a compressor, a combustor, and a turbine and suggesting that the turbine has a number of static vane assemblies and rotating turbine wheel assemblies.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis A and drive the compressor 14 and the fan 12.

Figure 2:
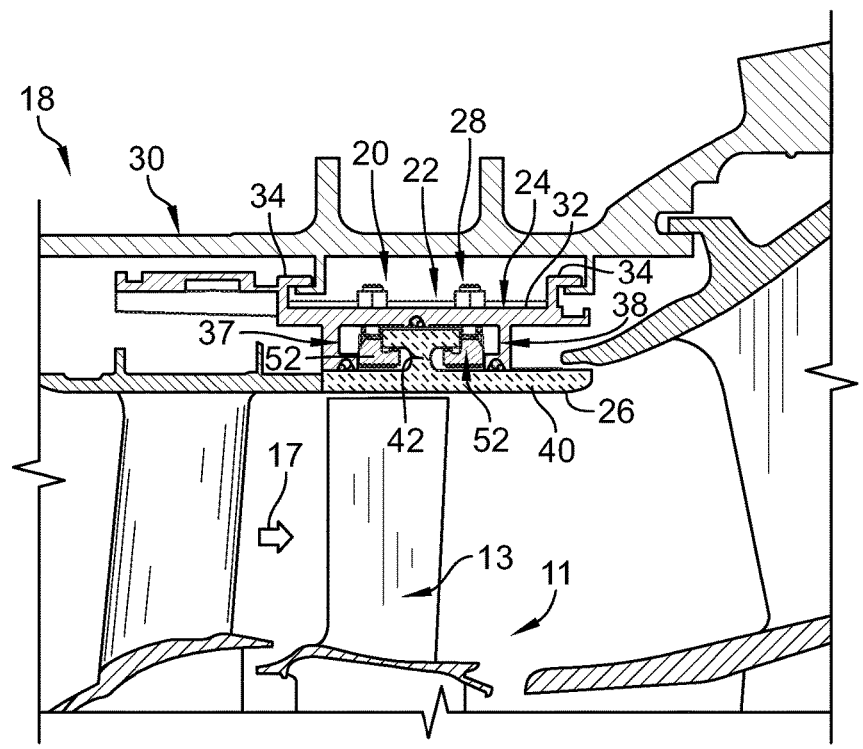
FIG. 2 is a partial cross-sectional view of the turbine included in the gas turbine engine of FIG. 1 showing the arrangement of a segmented turbine shroud radially outward from blades of one of the rotating turbine wheel assemblies, the turbine shroud having a mounting system that includes a plurality of braces for coupling a blade track segment with a carrier.

The turbine 18 includes at least one turbine wheel assembly 11 and a turbine shroud assembly 20 positioned to surround the turbine wheel assembly 11 as shown in FIGS. 1 and 2. The turbine shroud assembly 20 is coupled to an outer case 30 of the gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11 along a gas path 17. The blades 13 are in turn pushed by the combustion products to cause the turbine wheel assembly 11 to rotate; thereby, driving the rotating components of the compressor 14 and/or the fan 12.

The turbine shroud assembly 20 extends around the turbine wheel assembly 11 to prevent combustion products from passing over the top of the blades 13 without pushing the blades 13 to rotate as suggested in FIG. 2. In the illustrative embodiment, the turbine shroud assembly 20 is made up of a number of turbine shroud segments 22 that extends a limited axial distance across the central axis A and cooperates to surround the turbine wheel assembly 11 as suggested in FIG. 2. The turbine shroud segments 22 are sealed against one another circumferentially, such as by strip seal members, to provide a continuous turbine shroud. In other embodiments, the turbine shroud assembly 20 is annular and non-segmented to extend fully around the central axis A and surround the turbine wheel assembly 11. In yet other embodiments, certain components of the turbine shroud assembly 20 are segmented while other components are annular and non-segmented.

Figure 3:
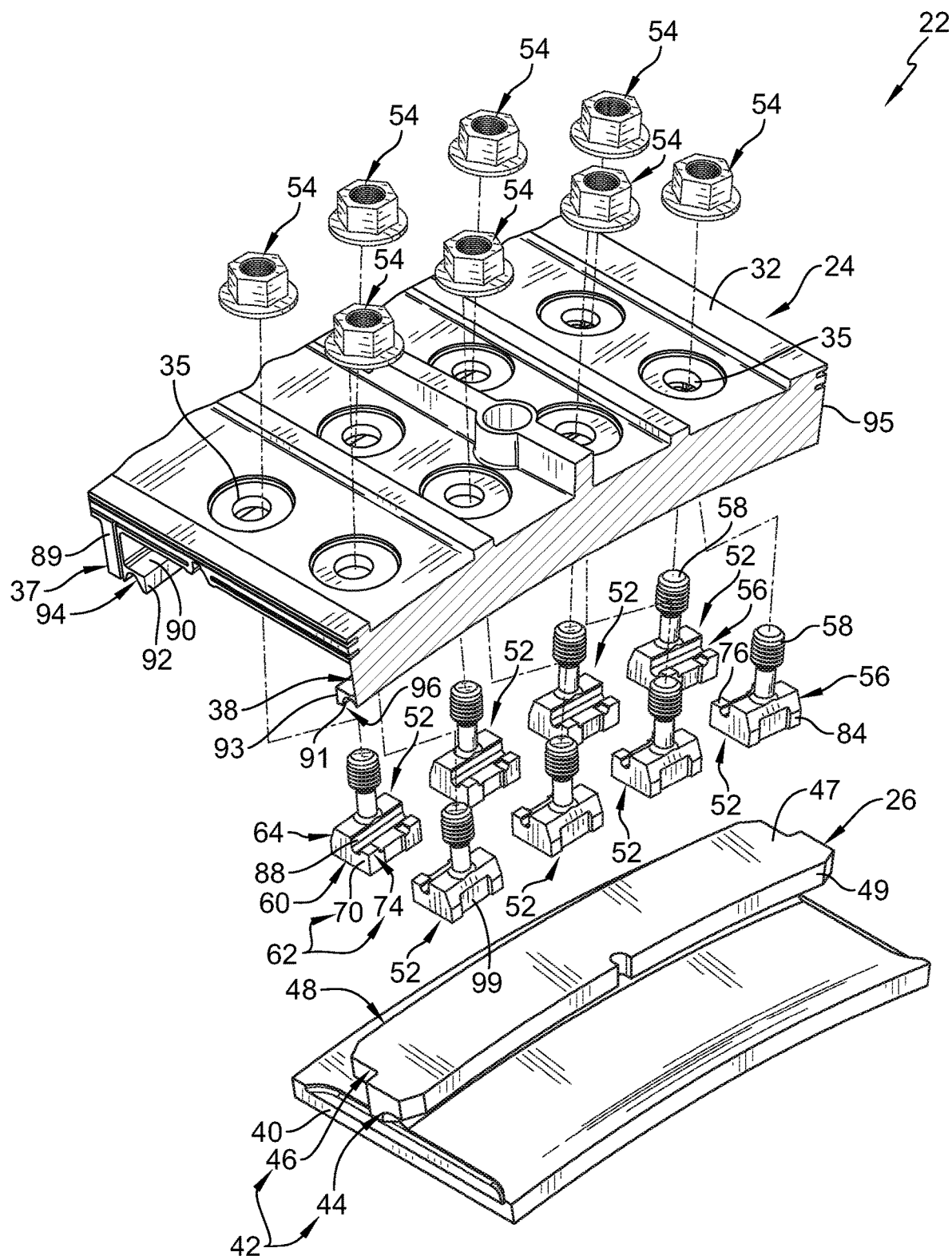
FIG. 3 is an exploded perspective assembly view of the turbine shroud segment of FIG. 2 showing that the turbine shroud segment includes the carrier, the blade track segment spaced apart from the carrier, and the mounting system that includes the plurality of braces, and each brace having a threaded shaft and a bracket that engages the blade track segment.
Figure 4:
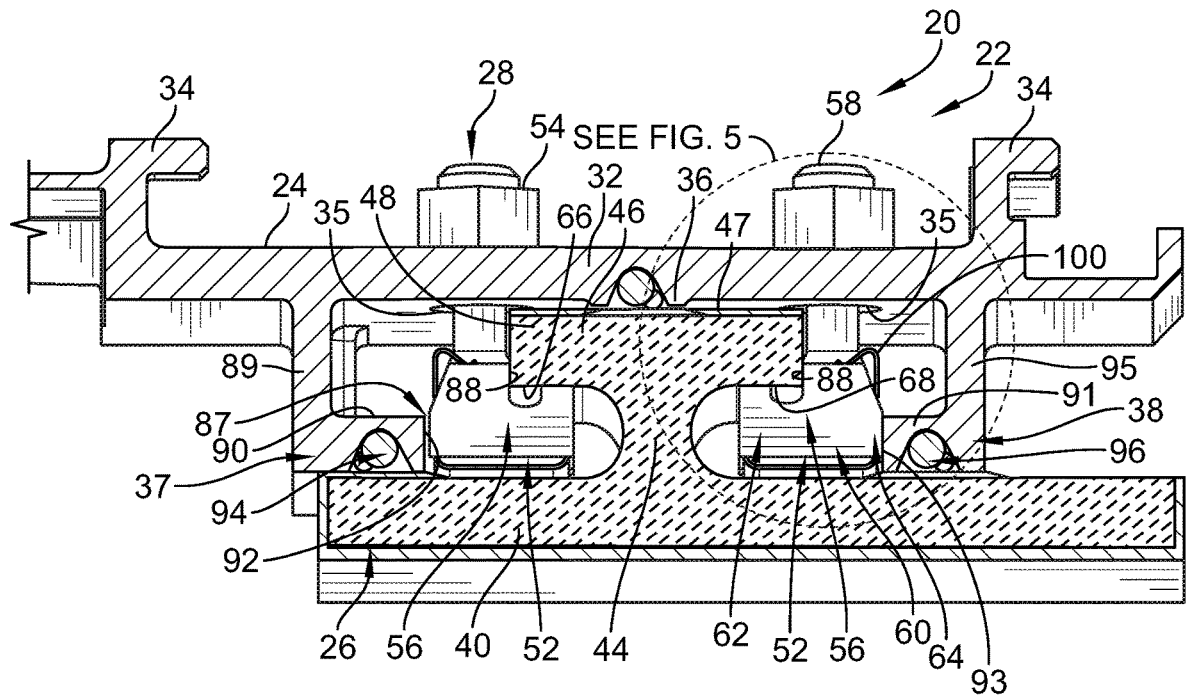
FIG. 4 is a detail view of a portion of FIG. 2 showing the turbine shroud segment that includes the carrier segment, the blade track segment, and the mounting system for coupling the blade track segment to the carrier segment, and showing that the mounting system includes the plurality of braces that engage an inner surface of the blade track segment.

Each turbine shroud segment 22 includes a carrier segment 24, a blade track segment 26, and a mounting system 28 configured to couple the blade track segment 26 to the carrier segment 24 as shown in FIGS. 3 and 4. The carrier segment 24 is a metallic support component configured to interface with other metallic components spaced from the gas path 17 of the engine 10. The blade track segment 26 is a ceramic matrix composite component configured to directly face the high temperatures of the gas path 17. The mounting system 28 is designed to engage the blade track segment 26 so as to distribute mounting and pressure loads so that threaded shafts (or studs) 58 included in the mounting system 28 are not exposed to undesired bending moments.

The carrier segment 24 included in each turbine shroud segment 22 is coupled to the outer case 30 of the engine 10 as shown in FIG. 2. Each carrier segment 24 illustratively includes a body plate 32, hangers 34, locating pads 36, a forward reinforcement flange 37, and an aft reinforcement flange 38 as shown in FIGS. 3 and 4. The body plate 32 extends circumferentially partway around the axis A and is formed to include through holes 35 that extend radially through the body plate 32 and through which the mounting system 28 extends. The hangers 34 extend radially outward from the body plate 32 and engage the outer case 30 to couple the turbine shroud segment 22 to the rest of the engine 10. Illustratively, the plurality of locating pads 36 extend radially inward from the body plate 32 and are circumferentially spaced so that at least three contact the blade track segment 26 to radially locate the blade track segment 26 relative to the carrier segment 24. The locating pads 36 may be machined to help place the blade track segment 26 in a desired orientation relative to the carrier segment 24.

The forward reinforcement flange 37 is configured to limit movement of the mounting system 28 and provide a seal between the carrier segment 24 and the blade track segment 26 as suggested in FIG. 4-7. The forward reinforcement flange 37 includes a forward wall 89 that extends radially inward from the body plate 32 and a forward leg 90 that extends axially aft away from the forward wall 89 towards the blade track segment 26.

The forward leg 90 has an aft radial surface 92 that extends circumferential around the axis A as shown in FIGS. 3 and 4. In one embodiment, the aft radial surface 92 reacts loads from the brackets 56 of the mounting system 28. The aft radial surface 92 faces braces 52 included in the mounting system 28. Illustratively, the aft radial surfaces 92 are spaced apart axially from the braces 52 by a gap 87 as shown in FIG. 7.

Figure 7:
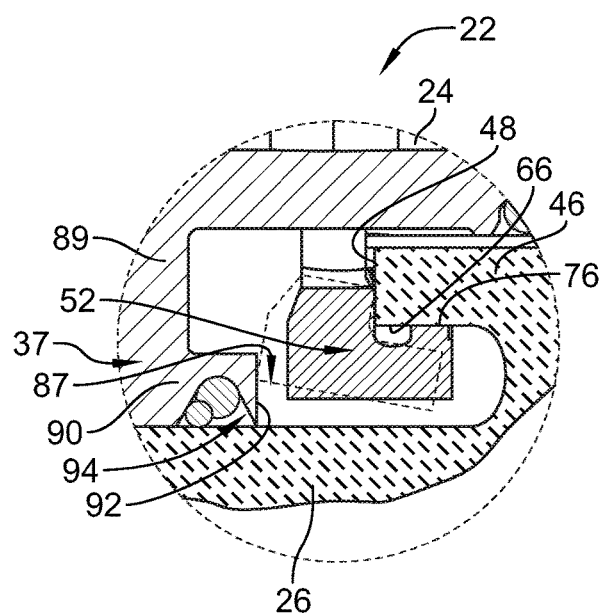
FIG. 7 is a detailed view of the mount assembly of FIG. 4 suggesting that a moment is applied to the brace when a radially inward load is applied to the blade track causing the brace to plastically deform until the load reaction pads of the brace contacts the reinforcement arm of the carrier to limit the amount of deformation of the brace.

The forward leg 90 is formed to define a forward sealing channel 94 as shown in FIGS. 4 and 7. The forward sealing channel 94 extends radially into the forward leg 90 and circumferentially relative to the axis A. The forward sealing channel 94 receives a seal therein that engages the forward leg 90 and the blade track segment 26 to block gases from passing between the fore end of the carrier segment 24 and the blade track segment 26.

The aft reinforcement flange 38 is configured to limit movement of the mounting system 28 and provide a seal between the carrier segment 24 and the blade track segment 26 as suggested in FIG. 4-7. The aft reinforcement flange 38 is spaced apart axially from the forward reinforcement flange 37 to locate a portion of the blade track segment 26 therebetween. The aft reinforcement flange 38 includes an aft wall 95 that extends radially inward from the body plate 32 and an aft leg 91 that extends axially forward away from the aft wall 95 towards the blade track segment 26. The aft leg 91 had a forward radial surface 93 that extends circumferentially around the axis A. The forward radial surface 93 axially locates the blade track segment 26 through the brackets 56 of the mounting system 28. The forward radial surface 93 engages directly a number of braces 52 included in the mounting system 28 to limit movement of the braces 52 as suggested in FIG. 5.

Figure 5:
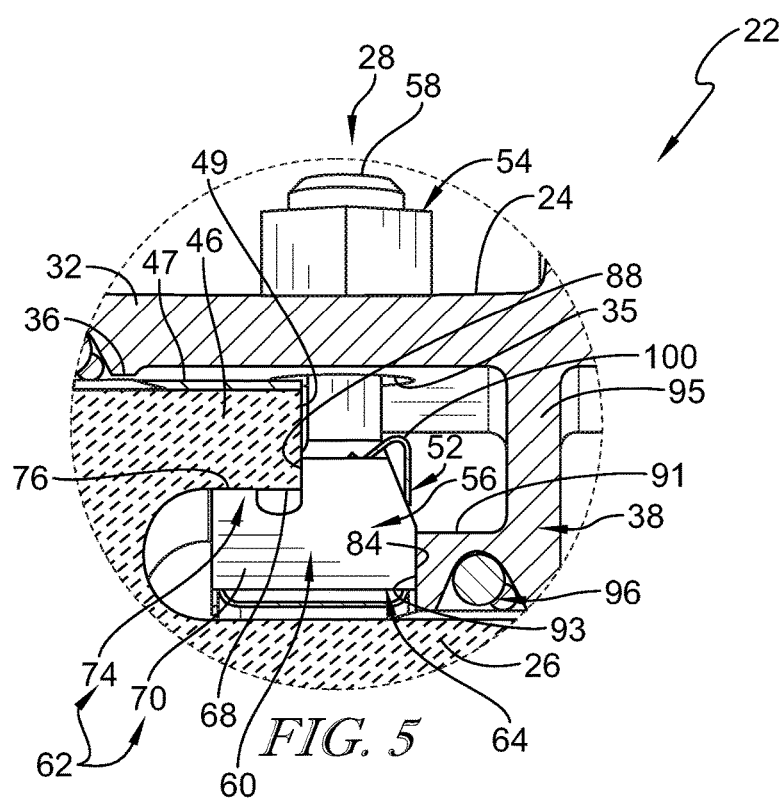
FIG. 5 is a further detail view of the circled portion of FIG. 4 showing that each of the braces has a bracket that extends from the threaded stud and that is formed to include track-location arms that engages the blade track segment and a load-reaction arm that engages the carrier segment to carry reaction loads induced on the bracket and thereby manage bending moment loads applied to the threaded stud when pressure in the engine is applied to the blade track segment.

The aft leg 91 is formed to define an aft sealing channel 96 as shown in FIGS. 4 and 5. The aft sealing channel 96 extends radially into the aft leg 91 and circumferentially relative to the axis A. The aft sealing channel 96 receives a seal therein that engages the aft leg 91 and the blade track segment 26 to block gases from passing between the aft end of the carrier segment 24 and the blade track segment 26.

The blade track segment 26 of each turbine shroud segment 22 comprises ceramic matrix composite materials as suggested in FIGS. 2 and 3. The blade track segment 26 is held in place adjacent to tips of turbine blades 13 to block combustion products from passing over the blades 13 without pushing the blades 13 to rotate as suggested in FIG. 2. The blade track segment 26 is illustratively formed to include a runner 40 and an attachment portion 42. The runner 40 is arcuate and extends circumferentially partway around the axis A adjacent to turbine blades 13. The attachment portion 42 extends radially outward from the runner 40 to provide structure for coupling the blade track segment 26 to the carrier segment 24.

In the illustrative embodiment, the attachment portion 42 of the blade track segment 26 has a T-shape when viewed in the circumferential direction. As such, that the entire blade track segment 26 has a generally I-beam shape when viewed in the circumferential direction shown in FIGS. 2 and 4.

The attachment portion (or attachment) 42 includes a stem 44 that extends radially outward from the runner 40 and an attachment panel 46 that extends axially forward and aft from the stem 44. The attachment panel 46 includes a radially outward surface 47, a forward radial surface 48, and an aft radial surface 49. In one embodiment, the aft radial surface 49 contacts the brackets 56, which further engage the carrier segment aft leg forward radial surface 93 of the aft reinforcement flange 38 to axially locate the blade track segment 26 in the turbine 18. The attachment panel 46 further includes a forward radial inner surface 66 and an aft radial inner surface 68 that face the axis A.

In other embodiments, the attachment portion 42 may be provided by L-shaped hangers, fir-tree shaped members, dovetail members, box shape panels, or other suitable features. The radially outward surface 47 of the panel 46 engages with the locating pads 36 of the carrier segment 24.

The mounting system 28 includes a plurality of braces 52 with corresponding threaded nuts 54 as shown in FIG. 3. The braces 52 are configured to assemble the blade track segment 26 to the carrier segment 24, and to distribute pressure loads applied to the attachment portion 42 of the blade track segment 26. Furthermore, as loads are applied to the blade track segment 26 during engine running, the braces 52 distribute the load radially through the threaded nuts 54 against the body plate 32, and axially against the forward reinforcement flange 37 and the aft reinforcement flange 38.

Figure 6:
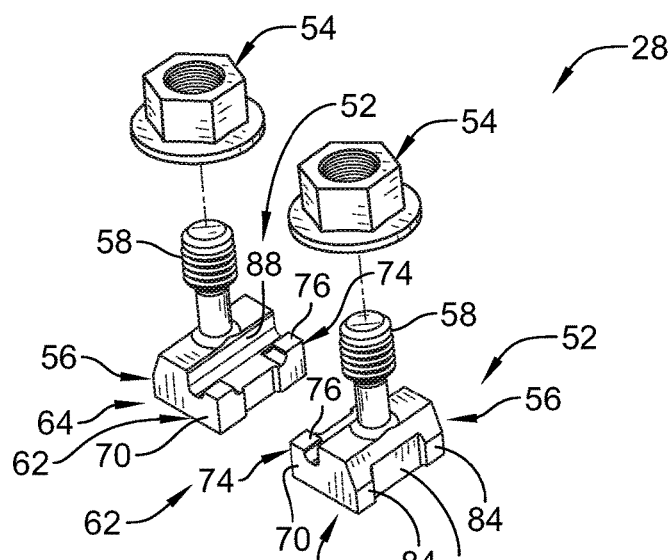
FIG. 6 is a detailed perspective view of the mounting system of FIG. 3 showing that the bracket included in each brace has the track-location arm that extends axially in one direction from the threaded stud and arranged to engage the blade track segment with two contact pads in the radial direction and the load reaction arm that extends in the opposite axial direction to the track-location arm and contains two load-reaction pads arranged to engage the carrier segment in the axial direction.

Each brace 52 is substantially similar to the other braces 52 as indicated in FIG. 3. Each brace includes a bracket 56 and a threaded attachment shaft 58 as shown in FIG. 6. The bracket 56 engages the attachment portion 42 of the blade track segment 26 and can react imparted loads from the blade track segment 26 on the forward reinforcement flange 37, or the aft reinforcement flange 38 as suggested in FIG. 5. The threaded shaft 58 of each brace 52 extends radially outward from the bracket 56 and through the hole 35 in the body plate 32 of the carrier segment 24, and into a corresponding threaded nut 54 as suggested in FIGS. 3-5.

Each bracket 56 of the brace 52 includes a support body 60, a track-location arm 62, and a load-reaction arm 64 as shown in FIGS. 5 and 6. Track-location arm 62 extends axially from the support body 60 toward the attachment portion 42 of the blade track segment 26. The load-reaction arm 64 extends axially from the support body 60 toward either the forward reinforcement flange 37, or the aft reinforcement flange 38. The threaded shaft 58 extends radially outward from the support body 60.

Track-location arm 62 of the brace 52 includes a cantilever boom 70 and at least one engagement pad 74 that engages with the attachment portion 42 of the blade track segment 26 as shown in FIGS. 5 and 6. Illustratively, the track-location arm 62 includes at least two engagement pads 74. The cantilever boom 70 extends axially from the support body 60. The engagement pads 74 extend radially outward from the cantilever boom 70 and are spaced circumferentially apart. Each engagement pad 74 includes a contact surface 76 that contacts the attachment panel inner surface 66, 68 of the attachment panel 46 of the blade track segment 26.

The load-reaction arm 64 of the brace 52 is configured to engage either the forward reinforcement flange 37 or the aft reinforcement flange 38 of the carrier segment 24 when pressure loads are applied to the blade track segment 26 as shown in FIGS. 4 and 5. The pressure load is transferred from the attachment panel inner surface 66, 68 to the contact surface 76 of the track-location arm 62 which creates moment force in the brace 52. The moment force pushes the load-reaction arm 64 towards either the forward reinforcement flange 37, or aft reinforcement flange 38 wherein the moment force is transferred into the carrier segment 24.

Each load-reaction arm 64 includes at least one load-reaction engagement pad 84. In the illustrative embodiment in FIG. 6, the load-reaction arm 64 includes two load-reaction engagement pads 84. Under load, the load-reaction engagement pads 84 directly contact either the aft radial surface 92 of the forward reinforcement flange 37, or the forward radial surface 93 of the aft reinforcement flange 38. Where there is a gap between the load-reaction engagement pads 84 and one of the radial surfaces 92, 93, the moment force may cause the brace 52 to plastically deform or bend until the load-reaction engagement pads 84 contact the radial surface 92, 93 as suggested in FIG. 7. The radial surfaces 92, 93, thus, limit bending of the braces 52 which, in turn, limits radial inward movement of the blade track segment 26.

A second use of the load-reaction engagement pads 84 is to accurately position the blade track segments 26 in the turbine 18 at assembly. The radial surface 48, 49 of the attachment panel 46 can be pushed axially into the axial engagement surface 88 which is axially positioned relative to the carrier segment 24 via the contact between the load-reaction engagement pads 84 and the aft radial surface 92 of the forward reinforcement flange 37 or forward radial surface 93 of the aft reinforcement flange, 38 as seen in FIG. 5. If the brace 52, which is forward of the blade track segment 26, is used to set the axial position of the blade track segment 26, a small gap will be present between the load-reaction engagement pads 84 and the forward radial surface 93 of the aft reinforcement flange 38. If the brace 52, which is aft of the blade track segment 26, is used to axially locate the blade track segment 26, a small gap will be present between the load-reaction engagement pads 84 and the aft radial surface 92 of the forward reinforcement flange 37, as shown in FIG. 4. This assembly configuration allows better control of axial build tolerances in the turbine 18.

Figure 8:
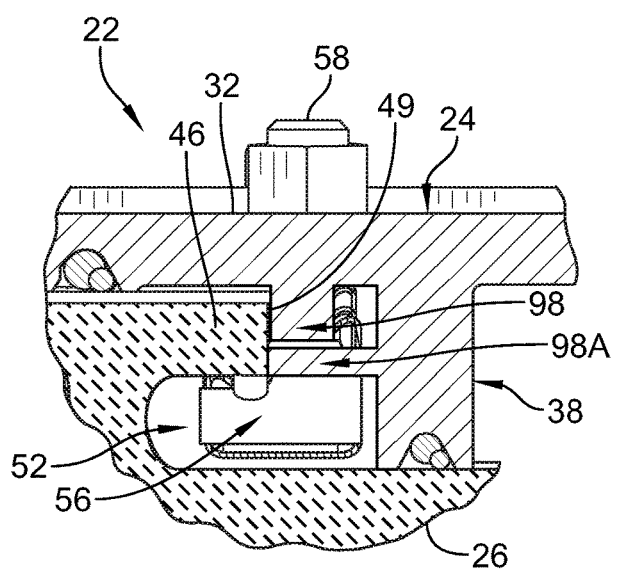
FIG. 8 is a detailed view of the mount assembly of FIG. 4 that shows two configurations for an axial location pad to locate the blade track axially in the carrier assembly that sit in the gap created between two circumferentially adjacent braces, wherein one axial location pad extends radially inward from the carrier outer wall, and an alternate axial location pad extends in an axial direction from the reinforcement arm of the carrier.

In another embodiment the carrier segment 24 includes an axial location feature 98, 98A for the blade track segment 26 to locate against as shown in FIG. 8. In one embodiment the axial location feature 98 extends radially inward from the body plate 32 of the carrier segment 24. The axial location feature 98 is positioned circumferentially between two adjacent braces 52. The axial position of the blade track segment 26 is set through contact of the surface 49 of the attachment panel 46 engaging the axial location feature 98. In another embodiment, the axial location feature 98A extends axially toward the blade track segment 26 from either the forward of aft reinforcement flanges 37, 38.

FIG. 4 shows the individual braces 52 reaching under the attachment panel 46 of the blade track segment 26. The load-reaction engagement pads 84 of the aft braces 52 can be seen as contacting the bottom portion of the forward radial surface 93 of the aft reinforcement flange 38. As shown in FIG. 4, there is a nominal gap between the forward braces 52 and the bottom portion of the aft radial surface 92 of the forward reinforcement flange 37. This is due to the nature of manufacturing stack ups.

Typically, a component may be located against another component/assembly in one location. In this case, if both the forward and aft braces 52 exactly contacted the carrier, then some times, the parts may not assemble since the load-reaction engagement pads 84 of the forward brace 52 to the load-reaction engagement pads 84 of the aft brace 52 distance may be too large to fit within the space between forward reinforcement flange 37 and the aft reinforcement flange 38. The aft braces 52 may carry significantly more load than the forward braces 52 due to pressure loading distribution on the blade track segments 26. So the aft braces 52 are assembled in contact with the carrier segment 24 nominally in the illustrative embodiment instead of the fore braces 52 being in contact with the carrier segment 24 at cold build.

This clearance/contact may be managed two ways. First, the tolerance stack can be managed to maintain the clearance at this location as tight as possible. Second, adequate clearance in the attachment arrangement may be provided to allow the aft braces 52 to be assembled against the carrier segment 24 and the blade track segment 26 against the aft braces 52. Of note is that the pressure loading on the blade track segment 26 may push the blade track segment 26 aft, maintaining this contact throughout operation. The loads in the front may be either too low to force axial contact, in which outer case 30 stresses may be low, or the loads may deflect the forward braces 52 until they contact the aft radial surface 92 of the forward reinforcement flange 37 which acts as a deflection (and thereby stress) limiter.

As drawn, the assembly has a heat shield 100 arranged around each of the plurality of braces 52 as shown in FIGS. 4 and 5. This heat shield 100 is shown to clip onto the forward and aft faces of the hooks (track-location arm 62 and load-reaction arm 64 of the braces 52), where the heat shield 100 nest within shallow grooves 99 on the forward and aft faces of the hooks (track-location arm 62 and load-reaction arm 64 of the braces 52) (also reference FIGS. 4 and 5). This embodiment illustrates how a heat shield 100 may interact with this disclosure while allowing it to function, but the features of this disclosure could be implemented with no heat shield 100 or with many different methods of mounting the heat shield 100.

FIG. 4 shows the braces 52 nested underneath the attachment panel 46 of the blade track segment 26. As shown in FIG. 6, each brace 52 has two engagement pads 74 with which it contacts the attachment panel inner surface 66, 68. By using a separate, threaded hook the attachment hardware may accommodate large tolerance variation on the attachment panel inner surface 66, 68. This may allow for the attachment panel inner surfaces 66, 68 to be left as-formed, avoiding the extra cost of machining for tighter tolerances.

FIG. 6 shows an embodiment of the braces 52 with two engagement pads 74 of the track-location arm 62 and two load-reaction engagement pads 84 of the load-reaction arm 64 that contact the forward and aft reinforcement flanges 37, 38. This arrangement may be advantageous in that it increases the number of load points, decreasing loads and contact stress at each contact location as well as giving the components more stability by providing two points of contact on a broader base rather than a single point of contact on the centerline which would be more susceptible to tipping. But these braces 52 may be constructed with a single engagement pad 74 of the track-location arm 62 and a single load-reaction engagement pad 84 of the load-reaction arm 64, or any combination of these options.

The blade track segment 26 could have many configurations such as an I-beam or hanger arrangements. The braces 52 may have one or two or more engagement pads 74, 84 per brace 52. The brace 52 may contain at least one load-reaction engagement pad 84 of the load-reaction arm 64 that contacts a radial surface 92, 93 of the forward or aft reinforcement flanges 37, 38, limiting deflection and reacting a moment load into the brace 52 to counter the inherent moment applied to the brace 52 by the load transfer from blade track segment 26 at the engagement pads 74 of the track-location arm 62.

The load-reaction engagement pad 84 of the load-reaction arm 64 may be located towards the lower end of the brace 52. This may reduce the magnitude of the reaction load by providing a longer moment arm from the pivot point at the threaded nut 54 to carrier interface at the radial surface 92, 93 of the forward or aft reinforcement flanges 37, 38. If there is a small clearance before the brace 52 contacts the carrier segment 24, then for a given amount of clearance, a lower contact point may result in less of a deflection angle. In this way, stresses may be minimized by locating the load-reaction engagement pad 84 at a lower radius.

The features of the disclosure may be applied to ganged hangers as well (as one example, a single brace per side with multiple parallel threaded studs on a single hook). This concept could be applied to an arrangement with a single brace 52 and single threaded shaft 58 per row.

This concept could be used with or without heat shields 100. The heat shield 100 could be attached in many different ways including providing a shallow groove on the forward and aft side of the brace 52 has the advantages of combining features (creates two load pads while providing clearance for the heat shield 100) and it captures the heat shield 100 within the groove to avoid possibility of disassembly during operation.

As drawn in FIG. 4, the contact surfaces on the radial surface 92, 93 are offset from the main wall of the forward and aft reinforcement flanges 37, 38 of the carrier segment 24. This may be beneficial for manufacturing because this may provide small surfaces with relief space for grinding of the radial surfaces 92, 93 of the forward and aft reinforcement flanges 37, 38.

The axial contact between the load-reaction engagement pads 84 of the load-reaction arm 64 and the radial surface 92, 93 of the forward or aft reinforcement flange 37, 38 could be located at any radial location between the threaded nut 54 and the bottom of the braces 52. In the illustrative embodiment, the contact between the load-reaction engagement pads 84 of the load-reaction arm 64 and the radial surface 92, 93 of the forward or aft reinforcement flange 37, 38 is as low as possible.

Assembly contact and clearances can be managed in a couple ways including parts machined to have tight tolerance and randomly assembled, living with the minimal clearances at the axial stops which result. Alternatively, parts may be assembled in such a way as to ensure contact against the higher loaded row of braces 52 while leaving a minimal clearance at the other row of braces 52. This may be accomplished, in one example, by leaving adequate clearance to enable contact as desired within all tolerance combinations. Parts can also be assembled in such a way as to ensure both rows of braces 52 contact against the carrier segment 24. This may be accomplished by leaving adequate tolerance on the second row of braces 52 to enable the braces 52 to be shifted to make contact.

The pressure loads typically impart an axial force on the blade track segment 26 which attempts to move the blade track segment 26 aft. Axial engagement surfaces 88 can be added to the brace 52 which would contact the attachment panel radial surface 48, 49 of the blade track segment 26. In this manner, axial pressure loads could be transferred through the aft row of braces 52 to the aft reinforcement flange 38.

Depending on the magnitude of this axial pressure load, the axial engagement surface 88 on the brace 52 may be closer in radius to the load-reaction engagement pad 84 of the load-reaction arm 64 on the brace 52 rather than the bottom of the radius. To minimize the bending moment imparted to the brace 52 from the combination of axial pressure load and offset radial pressure load, the axial engagement surface 88 with the attachment panel radial surface 48, 49 may be located radially to balance all these loads (resulting in minimization of the axial contact reaction load).

While the present disclosure specifically teaches the use of a mounting system in a turbine shroud having ceramic matrix composite blade track segments, it is contemplated that other assemblies may benefit from features of the specific design described. The turbine shroud may include all or some metallic components. In another example, the mounting system and/or other features of the present disclosure may be incorporated into a combustor having ceramic matrix composite liner tiles that surround the combustion chamber. In another example, the mounting system and/or other features of the present disclosure may be incorporated into an exhaust assembly having ceramic matrix composite heat shields. In yet another example, the mounting system and/or other features of the present disclosure may be incorporated into heat shields for spacecraft. Moreover, the teachings of the present disclosure may be applied to any assembly facing high temperature operating conditions.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment adapted for use in a gas turbine engine, the turbine shroud segment comprising
   a carrier segment comprising metallic materials, the carrier segment including an outer wall that extends axially and circumferentially relative to an axis and a first reinforcement flange that extends radially inward from the outer wall of the carrier segment,
   a blade track segment comprising ceramic matrix composite materials, the blade track segment formed to include a runner shaped to extend circumferentially partway around the axis and an attachment portion that extends radially outward from the runner relative to the axis, and
   a mounting system configured to couple the blade track segment with the carrier segment, the mounting system including a first brace formed to include a bracket that engages the attachment portion of the blade track segment and a threaded shaft that extends from the bracket radially outward through the outer wall of the carrier segment to couple the blade track segment with the carrier segment at an attachment joint,
   wherein the bracket of the first brace is configured to engage the first reinforcement flange of the carrier segment to limit bending of the first brace about the attachment joint due to radial force loads being applied to the blade track segment and transferred to the bracket of the first brace so that the first brace maintains a radial position of the blade track segment relative to the axis,
   wherein the bracket of the first brace includes a support body from which the threaded shaft extends, a track-location arm that extends axially outward from the support body and engages an inner surface of the attachment portion of the blade track segment, and a load-reaction pad that extends axially from the support body and is configured to engage the first reinforcement flange,
   wherein the first reinforcement flange includes a radially extending lip and a leg that extends axially from the lip and the leg is configured to engage the load-reaction pad included in the bracket.

2. The turbine shroud segment of claim 1, wherein the load-reaction pad is engaged directly with the first reinforcement flange.

3. The turbine shroud segment of claim 1, wherein the load-reaction pad is spaced apart from the first reinforcement flange prior to the radial force loads being applied to the blade track segment and transferred to the bracket of the first brace and the first brace is configured to deform plastically to cause the load-reaction pad to engage the first reinforcement flange during use of the turbine shroud segment in response to the radial force loads being applied to the blade track segment and transferred to the bracket of the first brace.

4. The turbine shroud segment of claim 1, wherein the lip and the leg cooperate to define a seal channel that extends radially into the first reinforcement flange and extends circumferentially relative to the axis.

5. The turbine shroud segment of claim 1, wherein an axially aft facing surface of the load-reaction pad is configured to engage an axially fore facing surface of the leg.

6. The turbine shroud segment of claim 1, wherein the bracket of the first brace is spaced apart from the first reinforcement flange and the threaded shaft of the first brace is configured to bend and deform plastically to cause the bracket of the first brace to engage the first reinforcement flange of the carrier segment during use of the turbine shroud segment.

7. The turbine shroud segment of claim 6, wherein the carrier segment includes a second reinforcement flange spaced apart axially from the first reinforcement flange to locate the mounting system there between, the mounting system further includes a second brace formed to include a bracket that engages the attachment portion of the blade track segment and a threaded shaft that extends from the bracket radially outward through the outer wall of the carrier segment to couple the blade track segment with the carrier segment, the first brace is spaced apart axially from the second brace to locate the blade track segment there between, and the second brace is engaged with the second reinforcement flange of the carrier segment without bending of the threaded shaft of the second brace.

8. The turbine shroud segment of claim 1, wherein the attachment portion of the blade track segment has a T-shape when viewed in the circumferential direction with a stem that extends radially outward from the runner.

9. The turbine shroud segment of claim 1, wherein the carrier segment further includes a locator pad that extends from one of the outer wall and the first reinforcement flange and engages the attachment portion of the blade track segment to axially locate the blade track segment relative to the carrier segment.

10. A turbine shroud segment adapted for use in a gas turbine engine, the turbine shroud segment comprising a carrier segment comprising metallic materials, the carrier segment including an outer wall that extends axially and circumferentially relative to an axis and a first reinforcement flange that extends radially inward from the outer wall of the carrier segment, a blade track segment comprising ceramic matrix composite materials, the blade track segment formed to include a runner shaped to extend circumferentially partway around the axis and an attachment portion that extends radially outward from the runner relative to the axis, and a mounting system configured to couple the blade track segment with the carrier segment, the mounting system including a first brace formed to include a bracket that engages the attachment portion of the blade track segment and a threaded shaft that extends from the bracket radially outward through the outer wall of the carrier segment to couple the blade track segment with the carrier segment at an attachment joint, wherein the bracket of the first brace is configured to engage the first reinforcement flange of the carrier segment to limit bending of the first brace about the attachment joint due to radial force loads being applied to the blade track segment and transferred to the bracket of the first brace so that the first brace maintains a radial position of the blade track segment relative to the axis, wherein the carrier segment further includes a locator pad that extends from one of the outer wall and the first reinforcement flange and engages the attachment portion of the blade track segment to axially locate the blade track segment relative to the carrier segment, wherein the locator pad extends axially from the first reinforcement flange and engages an axially aft facing surface of the attachment portion of the blade track segment.

11. A turbine shroud adapted for use in a gas turbine engine, the turbine shroud comprising a carrier component that includes an outer wall that extends circumferentially at least partway around an axis and a reinforcement flange that extends radially inward from the outer wall, a blade track segment formed to include a runner shaped to extend circumferentially partway around the axis and an attachment portion that extends radially outward from the runner, and a mounting system that includes a plurality of braces and a plurality of threaded nuts engaged with the plurality of braces, each brace included in the plurality of braces including a threaded shaft that extends through the outer wall of the carrier component, a track-location arm that extends axially forward or aft of the threaded shaft and engages the attachment portion of the blade track segment, and a load-reaction pad that extends axially forward or aft of the threaded shaft, opposite of the track-location arm, and a radially extending and axially facing surface of the load-reaction pad engages a radially extending and axially facing surface of the reinforcement flange of the carrier component.

12. The turbine shroud of claim 11, wherein the track-location arm includes a cantilevered boom that extends from a support body included in the brace and a plurality of engagement pads that extend radially outward from the cantilevered boom of the track-location arm into direct contact with the blade track segment.

13. The turbine shroud of claim 12, wherein the plurality of engagement pads included in the track-location arm includes two circumferentially spaced apart pads.

14. The turbine shroud of claim 11, wherein the attachment portion of the blade track segment has a T-shape when viewed in the circumferential direction with a stem that extends radially outward from the runner and an attachment panel that extends axially forward and aft from the stem such that the entire blade track segment has a generally I-beam shape when viewed in the circumferential direction.

15. The turbine shroud of claim 14, wherein at least one of the plurality of braces is located along an axially forward side of the attachment portion of the blade track segment and at least one of the plurality of braces is located along an axially aft side of the attachment portion of the blade track segment.

16. The turbine shroud of claim 11, wherein the reinforcement flange includes a lip that extends radially inward from the outer wall and a leg that extends axially from the lip and is configured to engage the plurality of braces.

17. The turbine shroud of claim 11, wherein the reinforcement flange includes a radially extending lip and a leg that extends axially from the lip and the leg engages the load-reaction pad.

18. The turbine shroud of claim 11, wherein the carrier segment further includes a locator pad that extends from one of the outer wall and the reinforcement flange and engages the attachment portion of the blade track segment to axially locate the blade track segment relative to the carrier segment and wherein the locator pad extends axially from the reinforcement flange and engages an axially aft facing surface of the attachment portion of the blade track segment.

19. The turbine shroud of claim 11, wherein the load-reaction pad of each brace is located at the radially inward terminating end of each brace.

20. The turbine shroud of claim 11, wherein the load-reaction pad of each brace is a first load-reaction pad and each brace further includes a second load-reaction pad spaced circumferentially apart from the first load-reaction pad and extending axially forward or aft of the threaded shaft, opposite of the track-location arm.

* * * * *